United States Patent [19]

Ganzhorn, Jr. et al.

[11] Patent Number: 5,402,674
[45] Date of Patent: Apr. 4, 1995

[54] METHOD AND APPARATUS FOR AUTOMATICALLY RESTRAINING A VEHICLE ON A TEST STAND

[75] Inventors: Donald W. Ganzhorn, Jr., Solon; Eser Manav, Lyndhurst; Dale A. Pulver, Twinsburg, all of Ohio

[73] Assignee: Ganzcorp. Investments, Inc., Twinsburg, Ohio

[21] Appl. No.: 79,995

[22] Filed: Jun. 18, 1993

[51] Int. Cl.[6] .............................................. G01L 3/26
[52] U.S. Cl. ..................................................... 73/117
[58] Field of Search ................ 73/117, 126, 123, 669, 73/11.08, 670

[56] References Cited

U.S. PATENT DOCUMENTS

| | | | |
|---|---|---|---|
| 3,520,180 | 7/1970 | Polhemus et al. | 73/117 |
| 3,596,241 | 7/1971 | Migneault | 340/932.2 |
| 3,797,656 | 3/1974 | Kitchen, Jr. et al. | 206/335 |
| 3,861,204 | 1/1975 | Fillingim | 73/117 |
| 3,897,636 | 8/1975 | Leblanc | 73/117 |
| 3,900,092 | 8/1975 | Page et al. | 194/241 |
| 3,914,990 | 10/1975 | Borg | 73/670 |
| 3,965,731 | 6/1976 | Asmus | 73/126 |
| 4,161,116 | 7/1979 | Fegraus et al. | 73/117 |
| 4,393,694 | 7/1983 | Marten et al. | 73/117 |
| 4,455,866 | 6/1984 | Barrigar | 73/117 |
| 4,527,416 | 7/1985 | Haeg et al. | 73/11.08 |
| 4,798,088 | 1/1989 | Haeg et al. | 73/669 |
| 4,830,563 | 5/1989 | Yeakle | 414/401 |
| 4,901,560 | 2/1990 | Hirano et al. | 73/117 |
| 4,986,119 | 1/1991 | Gicewicz | 73/146 |
| 5,101,660 | 4/1992 | La Belle | 73/117 |
| 5,111,685 | 5/1992 | Langer | 73/117 |

OTHER PUBLICATIONS

Clayton Industries brochure entitled "C–796E Chassis Dynamometer", 1988.
Burke E. Porter Machinery Company brochure.
Dynamic Auto Test Engineering Corp brochure.
Photograph of MAHA device.
ABB Industrial Systems, Inc. brochure entitled TEST SYSTEMS.
Brush Ind. Controls brochure.

*Primary Examiner*—Richard E. Chilcot, Jr.
*Assistant Examiner*—James M. Olsen
*Attorney, Agent, or Firm*—Tarolli, Sundheim & Covell

[57] ABSTRACT

An apparatus and method for automatically restraining a vehicle on a vehicle test stand having at least one pair of rollers rotatably mounted to a frame comprises a restraining device movably mounted relative to the test stand frame. A motor is drivably connected to the restraining device for, when actuated, moving the restraining device relative to the frame. An actuating device provides a first signal when it is desired to move the restraining device into an operative restraining position and a second signal when it is desired to move the restraining device out of the operative restraining position. A controller is connected to the motor and to the actuating device for controlling energization of the motor in response to the actuating device to move the restraining device automatically into or out of the operative restraining position.

22 Claims, 4 Drawing Sheets

METHOD AND APPARATUS FOR AUTOMATICALLY RESTRAINING A VEHICLE ON A TEST STAND

TECHNICAL FIELD

The present invention is directed to vehicle test stands having rollers operatively engageable by vehicle wheels and is particularly directed to a method and apparatus for restraining a vehicle on such a test stand.

BACKGROUND OF THE INVENTION

Vehicle test stands having a pair of rollers operatively engageable by vehicle wheels are well known in the art. The test stand rollers may or may not be operatively connected to an energy conversion device. Vehicle test stands having the rollers connected to an energy conversion device include chassis dynamometers and vehicle brake testers.

In a chassis dynamometer, an actuatable power absorber is connected to the test stand roller pairs and applies a load force to a vehicle's drive wheels for testing purposes, such as pollution testing. A vehicle is driven onto the roller pairs of the test stand so that each drive wheel of the vehicle is straddled by an associated pair of rollers. Once positioned on the dynamometer, the vehicle's drive wheels are driven in rotation by the vehicle engine. The vehicle's drive wheels drive associated roller pairs into rotation. To load test the vehicle's engine, the power absorber is actuated to apply a braking force to the dynamometer rollers. This braking force on the vehicle's drive wheels effectively loads the vehicle's engine. Another form of chassis dynamometer includes a motor absorber connected to the test stand roller pair for selectively providing a braking or a driving force to the vehicle wheels.

In a brake tester, a drive motor is connected to the test stand rollers and applies a drive force to the vehicle wheels. A torque sensor is operatively connected to the test stand rollers and measures the torque developed when the vehicle brakes are applied. The measured torque is indicative of the vehicle's braking force.

Since substantial forces are present between the vehicle and the vehicle test stand during a vehicle test, it is desirable to restrain the vehicle on the test stand. One test stand restraining device has been proposed that requires the test stand operator to position a plurality of individual blocking devices, one blocking device in front of and one behind each tire. Once the vehicle and each of the blocking devices are positioned properly on the test stand, the operator must bolt each of the blocking devices in place to the test stand frame. After the test of the vehicle is completed, the operator must unbolt and remove each of the blocking devices to permit the vehicle to be driven off of the test stand. The use of such a restraining device is extremely time consuming and costly.

SUMMARY OF THE INVENTION

The present invention provides a method and apparatus for automatically restraining a vehicle on a vehicle test stand.

In accordance with one aspect of the present invention, an apparatus is provided for automatically restraining a vehicle on a vehicle test stand. The test stand includes a frame at least one pair of rollers rotatably mounted to the frame. The apparatus comprises restraining means movably mounted relative to the frame of the test stand. Motor means is drivably connected to the restraining means for, when actuated, moving the restraining means relative to the frame. Actuating means provides a first signal when it is desired to move the restraining means into an operative restraining position that restrains movement of the vehicle relative to the frame and a second signal when it is desired to move the restraining means out of the operative restraining position. The apparatus further comprises control means connected to the motor means and to the actuating means for controlling energization of the motor means in response to the actuating means to move the restraining means into or out of the operative restraining position.

In accordance with another aspect of the present invention, a method is provided for restraining a vehicle on a vehicle test stand, the test stand having a frame and at least one pair of rollers rotatably mounted to the frame, the method comprising the steps of providing a restraining means movably mounted relative to the frame of the test stand, providing a motor means drivably connected to the restraining means for, when actuated, moving the restraining means relative to the frame, providing a first signal when it is desired to move the restraining means into an operative restraining position that restrains movement of the vehicle relative to the test stand, providing a second signal when it is desired to move the restraining means out of the operative restraining position, and energizing the motor means in response to the first and second signals for moving the restraining means into or out of the operative restraining position.

In accordance with a preferred embodiment of the present invention, an apparatus is provided for automatically restraining a vehicle on a vehicle test stand. The test stand includes a frame and at least one pair of rollers rotatably mounted to the frame. The apparatus comprises a drive screw rotatably mounted to the frame and a traveling carriage is threadably mounted to the drive screw. Rotation of the drive screw in a first direction moves the traveling carriage in a first direction, and rotation of the drive screw in a second direction moves the traveling carriage in a second direction. The apparatus further comprises a linear bearing secured to the test stand frame. The traveling carriage is slidably mounted on the linear bearing. Restraining means are carried by the traveling carriage. Motor means is drivably connected to the drive screw for, when actuated, driving the drive screw in rotation for movement of the traveling carriage, and, in turn, the restraining means. Actuating means provide a first signal when it is desired to move the restraining means to an operative restraining position and a second signal when it is desired to move the restraining means out of an operative restraining position. The apparatus further includes control means connected to the motor means and to the actuating means for controlling energization of the motor means in response to the actuating means to move the restraining means to or out of an operative restraining position. Sensor means is carried by the traveling carriage for providing a signal indicative of whether the restraining means is at an operative restraining position. The control means is connected to the sensor means. The control means, when the actuator means provides the first signal, energizes the motor means to move the restraining means to an operative restraining position. The motor means remains energized until the sensor means indicates the restraining means is at an operative restraining position. In accordance with the preferred embodiment, the sensor provides an indication when the restraining device is first aligned with the vehicle wheel. The control means includes time delay means, the control means continuing to energize the motor means to move the restraining means in a restraining direction until a predetermine time after the sensor means first indicates that the restraining means has first aligned with the tire. The control means, when the actuator means provides the second signal, energizes the motor means to move the restraining means out of an operative restraining position.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Referring to FIGS. 1–4, a vehicle test stand 10 includes a frame 12 adapted to fit in a commensurate floor opening 54 at a test facility such as a vehicle pollution test station. The test stand 10 further includes a first roller pair 14, 16, and a second roller pair 18, 20 coaxially aligned with the first roller pair, respectively. The first roller pair 14, 16 is rotatable mounted to parallel oriented, spaced apart, cross supports 24, 26. The cross supports 24, 26 are secured to the frame 12 by such means as welding.

The rollers 14, 16, have shafts 28, 30, respectively, which are rotatably secured by yokes 34, 36 which are secured to the cross support 24. The rollers 14, 16, have shafts 40, 42, respectively, which are rotatably secured by yokes 44, 46 which are secured to the cross support 26. Rollers 18, 20 are similarly mounted to cross support members 50, 52 with associated yokes. The cross supports 50, 52 are also secured to the frame 12. Appropriate bearings, not shown, are used between the roller shafts and the securing means to permit low friction rotation of the rollers.

The first roller pair 14, 16 and the second roller pair 18, 20 are spaced apart in the frame 12 and are of sufficient length so as to receive any vehicle having a wheel base within an anticipated range. The mounting arrangement of the roller pairs and the frame are designed so that when the test stand 10 is placed in the floor opening 54, the top edge 58 of the frame 12 is level with the floor surface 56 and the upper extent of roller pairs 14, 16 and 18, 20 protrudes slightly above the floor surface 56.

The roller pairs 14, 16 and 18, 20 are free to rotate. The test stand 10 can be used to provide a means for running the vehicle driven wheels while the vehicle remains in place. In accordance with one embodiment of the invention, the shaft 40 of the roller 14 is operatively connected to an energy conversion device 60 which is secured at one end of the frame 12. Depending on the type of energy conversion device 60, the test stand 10 is either a dynamometer or a brake tester.

If the test stand 10 is a chassis dynamometer, the energy conversion device 60 is an energy absorber or a motor absorber. One type of energy absorber contemplated is an electrically controlled eddy current brake. If the test stand 10 is a chassis brake tester, the energy conversion device 60 is an electrically actuated motor. The energy conversion device 60 is covered by a cover plate 62.

The shaft 28 of the roller 14 is connected to a shaft 64 of roller 18 through a shaft coupler 65. The shaft 30 of the roller 16 is connected to a shaft 66 of roller 20 through a shaft coupler 67. The shafts 64, 66 are operative coupled together by a drive belt 70 connected to shaft pulleys 72, 74 of shafts 64, 66 respectively. In a dynamometer test stand, energization of the power absorber 60 results in a braking force to the first roller pair 14, 16, and to the second roller pair 18, 20 as a result of the belt connection 70. In a brake tester test stand, energization of the motor 60 results in a rotational drive force being applied to the first roller pair 14, 16, and to the second roller pair 18, 20 as a result of the belt connection 70.

The test stand 10 further includes a first actuatable restraining assembly 100 associated with the first roller pair 14, 16. A second actuatable restraining assembly 102 is associated with the second roller pair 18, 20. The details of the structure of each of the restraining assemblies 100, 102 are similar. Therefore, only the structure of one of the restraining assemblies is described in detail, it being understood that the other restraining assembly is similarly constructed and operatively arranged. Primed numbers are used to designate corresponding structural elements of the assembly 102.

The restraining assembly 100 includes a front support 110 and a rear support 112. The front support 110 and the rear support 112 are spaced apart and are located on opposite sides of the roller 14 and the roller 16. In this arrangement, the roller 14 is designated as the front roller and the roller 16 is designated as the rear roller. When a vehicle enters the test stand 10, the front of the vehicle is closest to the front rollers 14, 18.

The front support 110 includes a front supporting surface 120 which supports a linear bearing 122. The linear bearing 122 extends between spaced apart vertical supports 124, 126, which are, in turn, secured to the front support surface 120 by appropriate means. The vertical support 124 is preferably aligned with one end 128 of roller 14. The vertical support 126 preferably extends well beyond an end 130 of the roller 14.

A front drive screw member 140 is rotatably mounted to and between the vertical supports 124, 126 with bearing elements 142, 144 rotatably supporting the drive screw member 140 a fixed distance above the linear bearing 122 and parallel with the linear bearing 122. A smooth portion 146 of the drive screw 140 extends beyond the vertical support 124 and carries a pulley 148. The pulley 148 is drivably connected to a pulley 150 secured to the output shaft of an electric motor 152 through a drive belt 154. The electric motor 152 is secured to the frame 12 by appropriate means such as bolts.

Similarly, the rear support 112 includes a rear supporting surface 160 which supports a linear bearing 162. The linear bearing 162 extends between spaced apart vertical supports 164, 166, which are, in turn, secured to the rear support surface 160 by appropriate means. The vertical support 164 is preferably aligned with one end 168 of roller 18 and aligned with the vertical support 124. The vertical support 166 preferably extends well beyond the end 170 of the roller 18 and is aligned with the vertical support 126.

A drive screw member 180 is rotatably mounted to and between the vertical supports 164, 166 with bearing elements 182, 174 rotatable supporting the drive screw member 180 a fixed distance above the linear bearing 162 and parallel with the linear bearing 162. A smooth portion 186 of the drive screw member 180 extends beyond the vertical support 164 and carries a pulley 188. The pulley 188 is drivably connected to the pulley 150 secured to the output shaft of the electric motor 152 through a drive belt 194.

A traveling or movable carriage assembly 200 is threadably received on the drive screws 140, 180. In particular, the carriage 200 includes a front support member 202 threadably received on the drive screw 140 and in slidable bearing surface contact with the linear bearing 122. The carriage 200 further includes a rear support member 204 threadably received on the drive screw 180 and in slidable bearing surface contact with the linear bearing 162. A cross bar member 206 is secured to both of the support members 202, 204 so as to form a single traveling carriage assembly 200.

When the electric motor 152 is energized so that its output shaft and pulley 150 turns in first direction, the drive screws 140, 180 rotate in place in the same first direction. As the drive screws 140, 180 rotate in the first direction, the carriage 200 traverses across the test stand in a first direction. When the electric motor 152 is energized so that its output shaft and pulley 150 turns in second direction, the drive screws 140, 180 rotate in place in the same second direction. As the drive screws 140, 180 rotate in the second direction, the carriage 200 traverses across the test stand in a second direction.

The cross bar support 206 carries a side restraint wheel 208, a front restraint wheel 210, and a rear restraint wheel 212. Both restraint wheels 210, 212 extend inward of the test stand 10 and are at an elevation above the rollers 14, 16 so that when a vehicle is on the test stand 10 and the carriage is moved into an operative restraining position, the rolls 210, 212 are in operative blocking location respectively in front of and behind of an associated vehicle tire. The side restraint wheel 208 is preferably located approximately half way between the front restraint wheel 210 and the rear restraint wheel 212 and at elevation and location sufficient to effectively restrain a vehicle from sideways motion in a direction toward the carriage 200.

The carriage 200 furthers carries an optical sensing device 218 for sensing when the carriage is in an operative restraining position. In accordance with a preferred embodiment of the present invention, a first optical device 220 is carried near the end of the restrain roller 210. Depending on the type of optical device 220 used, a second optical device 222 is carried by the carriage 200 near the end of the rear restraint wheel 212 and can either be an optical receiving device or a reflector if the optical device 220 is a transceiver. In accordance with a preferred embodiment of the present invention, the device 220 is a light generator and the device 222 is a light receiver. If no tire is present in the light path between the devices 220, 222, the light sensor 222 outputs a first electric signal. If a tire "breaks" the light beam, the light receiver 222 outputs a second electric signal. The light transmitter 220 and the light receiver 222 can be positioned at a variety of locations on the carriage 200. Depending on the exact position of the light transmitter 220 and light receiver 222, a timing arrangement may be needed to insure that the restraining device 100 is in a fully operative restraining position before the motor 152 is deenergized. This timing arrangement continues to drive the motor 152 for a predetermined time period after the light beam is first broken.

A retracted travel limit Switch 240 is operatively mounted to the support 120. The switch 240 is preferably a spring biased swing arm switch having a first unactuated condition and a second actuated condition. The carriage 200 further carries a switch actuator arm 242. The switch 240 is positioned so that when the switch 240 is actuated by the switch actuator arm 242, the carriage 200 is in a fully retracted position sufficient to insure that a vehicle entering or exiting the test stand 10 will not be inhibited by the restraining wheels 208, 210, 212.

A second travel limit switch 246 is operatively mounted to the support 120. The switch 246 is preferably a spring biased swing arm switch having a first unactuated condition and a second actuated condition. The switch actuator arm 242 of the carriage 200 controls the condition of the switch 246. The switch 246 is position so that the switch 246 is actuated by the switch actuator arm 242 when the carriage 200 advances to a position well in excess of smallest vehicle wheel base anticipated to be tested on the test stand 10.

Figure 5:
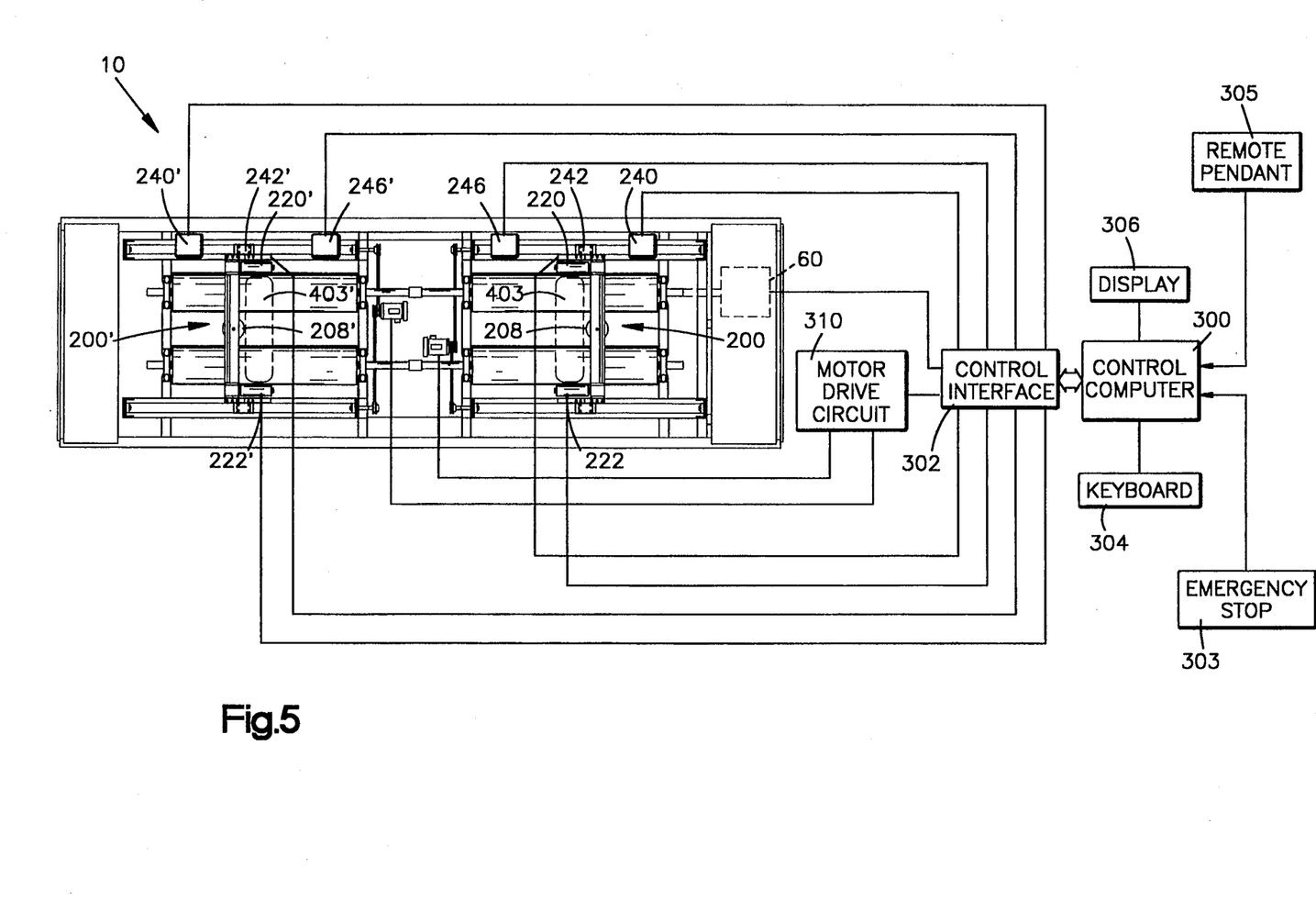
FIG. 5 is a schematic view of test stand similar to that shown in FIG. 1 further showing electrical interconnections of a control arrangement made in accordance with the present invention.

Referring to FIG. 5, a control computer 300 is operatively connected to the test stand 10 through a control interface circuit 302. The interface circuit 302 includes relay control logic and/or a programmable logic control. The control computer 300 can be any of several known types including a microcontroller or a personal computer. A keyboard 304 is operatively connected to the computer 300 for entering data or commands into the computer. A display 306 is operatively connected to the computer for displaying information to the test stand operator. It is contemplated that the display 306 and the keyboard 304 may be replaced by a touch screen device that simultaneously permits the display and input of information to the computer 300. It is also contemplated that the keyboard 304 can be replaced with a remote pendant switch 305 that the test stand operator would carry. An emergency stop switch 303 is connected to the computer 300.

The travel switches 240, 246, 240′, 246′, as well as the optical devices 220, 222, 220′, and 222′ are in electrical communication with the computer 300 through the control interface 302. As those skilled in the art will appreciate, the control interface includes commercially available input/output devices that permit electrical communication between the computer and the switches and the optical devices. The computer 300 is operatively connected to restraint drive motors 152, 152' through a motor drive circuit 310. The computer 300 is further connected to the energy converter 60 through the control interface 302.

Figure 6:
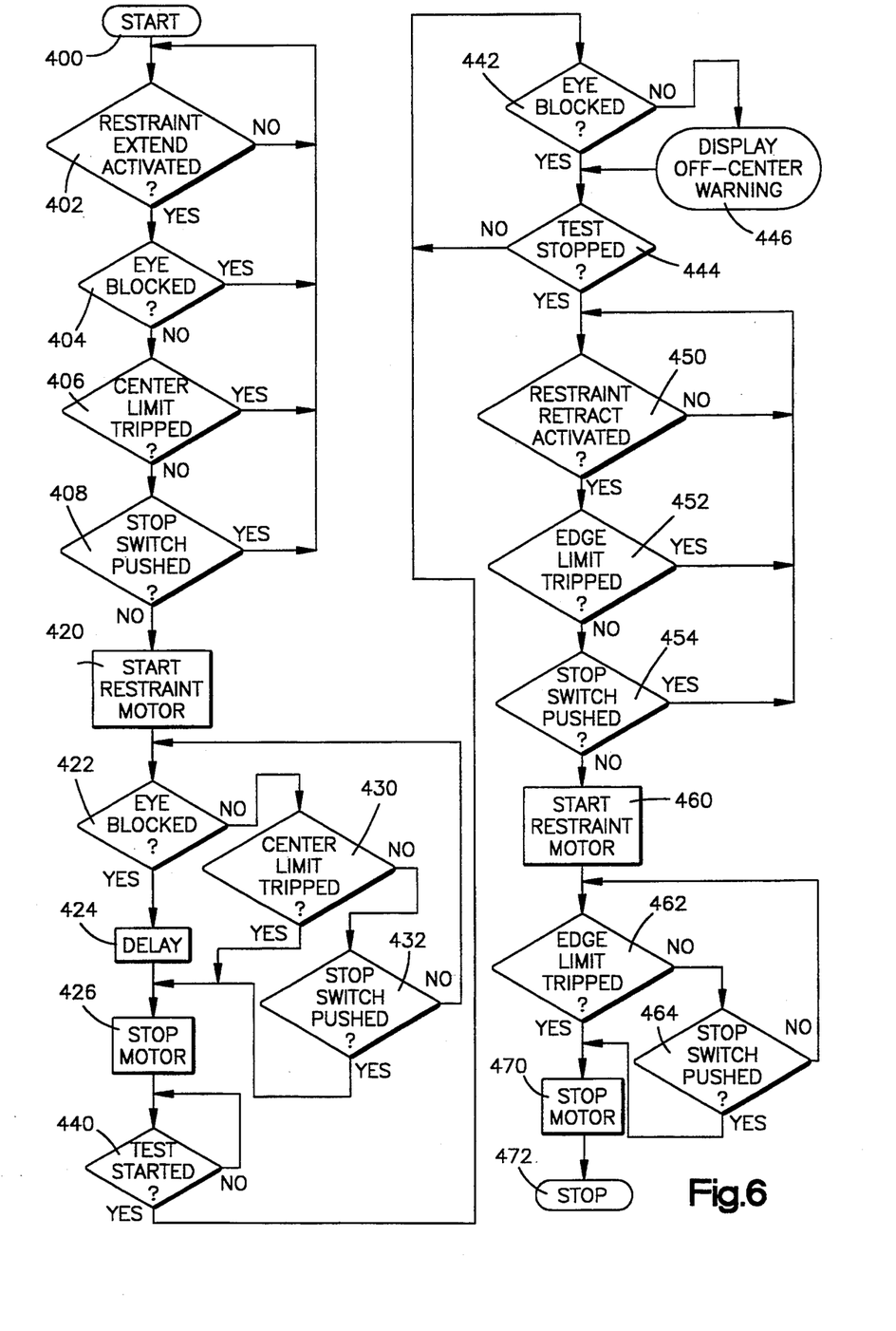
FIG. 6 is a flow chart depicting a control process for restraining a vehicle on a vehicle test stand in accordance with the present invention.

Referring to FIG. 6, a control process in accordance with the present invention is shown. The traveling carriages 200, 200' are controlled independently of each other. Although the control computer 300 will simultaneously actuate the motors 152, 152' to move the carriage toward a restraining position, the control of when the carriages stop is individually controlled in response to the sensors. The control process in FIG. 6 is for one of the restraining devices 100, it being understood that the control of the other restraining device 102 is similarly controlled preferably simultaneously with the restraining device 100.

In step 400, the computer is initialized with all internal states being set to a desired starting condition and memories cleared in a manner well known in the art. When the system is first initialized in step 400, the limit switch 240 is monitored to determine if the traveling carriage 200 is in its fully retracted position. If the switch 240 does not indicate the carriage 200 is in a fully retracted position, the operator is so informed through display 306. The motor 152 can be energized by the operator by entering a retraction command through the keyboard 304 to retract the traveling carriage 200 until the switch 240 indicates that the carriage 200 is in its fully retracted position.

Figure 1:
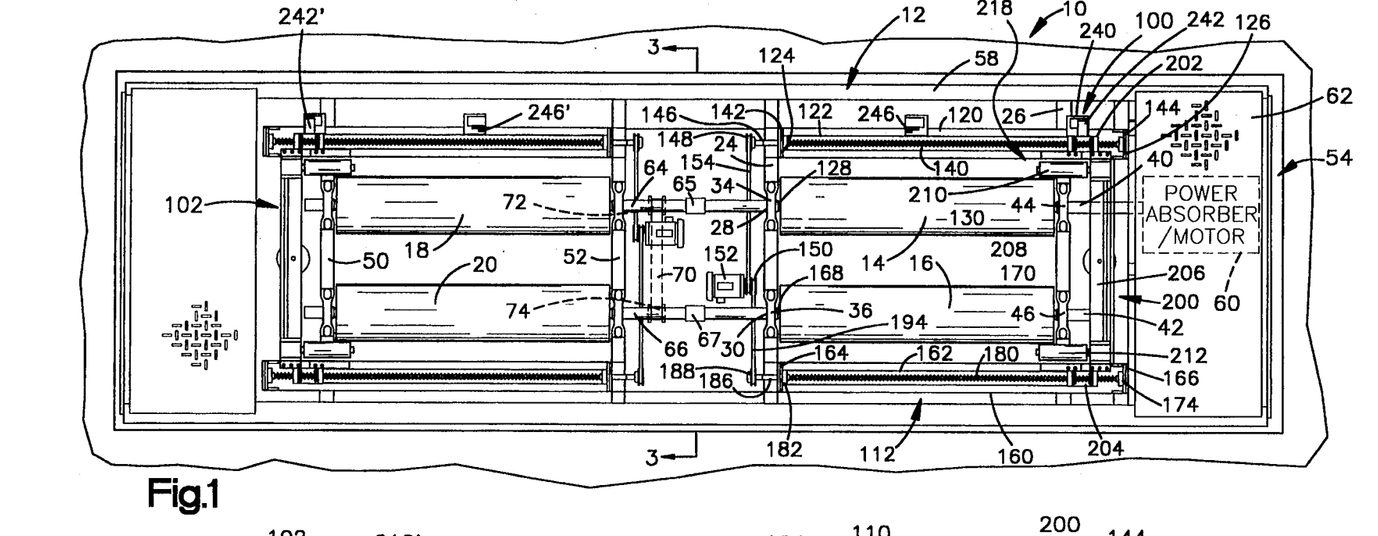
FIG. 1 is a schematic top plan view of a vehicle test stand having an automatic restraint system made in accordance with the present invention.
Figure 2:
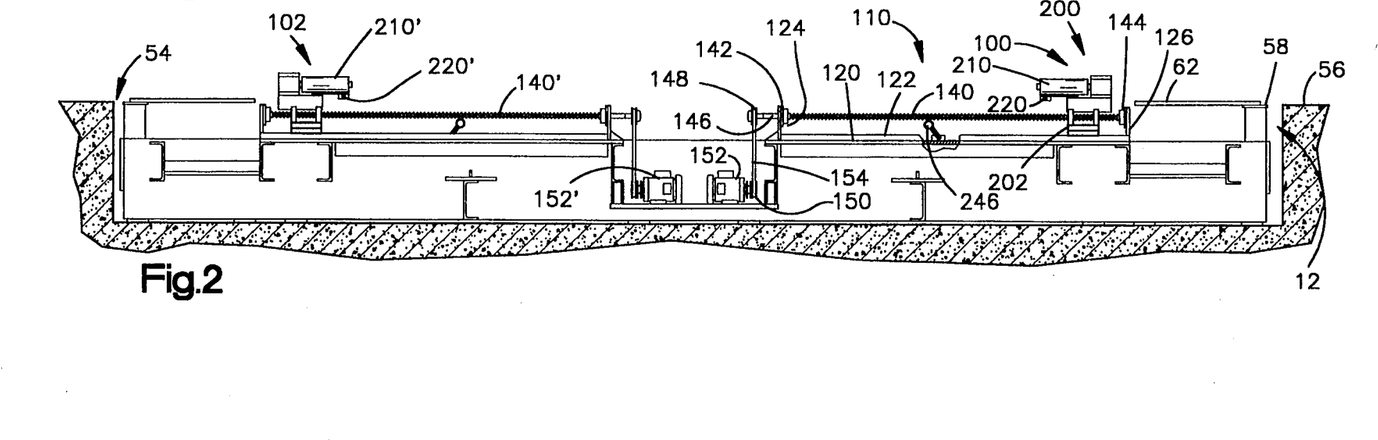
FIG. 2 is a schematic side elevation view with partial cut away of a portion of the test stand shown in FIG. 1 with certain parts removed for clarity.
Figures 3, 4:
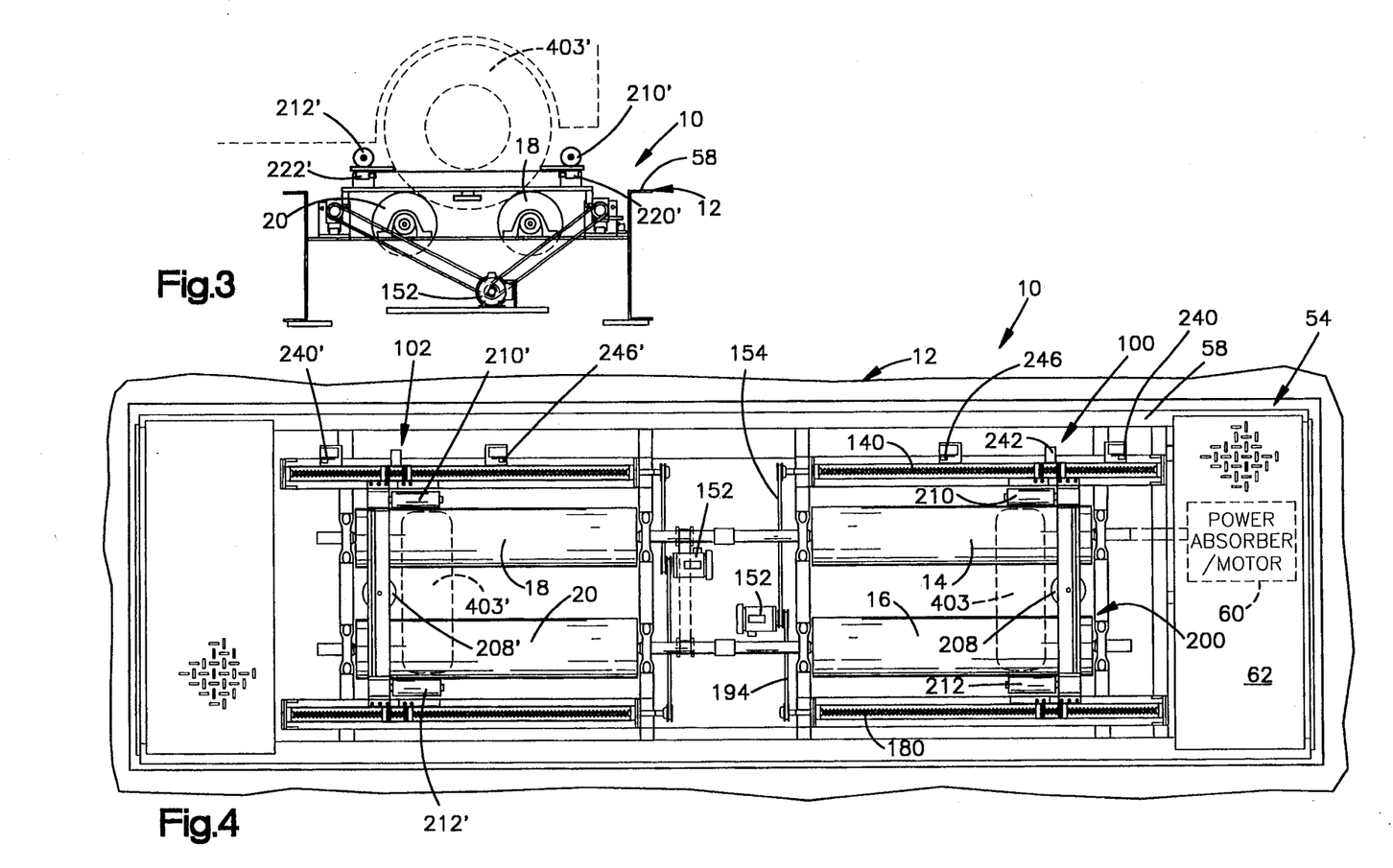
FIG. 3 is a schematic view along line 3—3 of FIG. 1 including a vehicle tire in phantom.
FIG. 4 is a schematic top plan view similar to FIG. 1 with the automatic restraints moved to an operative restraining position about vehicle tires shown in phantom.

Prior to actuation or providing of the command to actuate the restraining device, the rolls 14, 16 are locked and the vehicle is driven onto the test stand with the vehicle's drive wheels between rollers 14, 16 and 18, 20. FIGS. 3 and 4 shown vehicle drive wheels 403, 403' on the test stand. The wheel spacing is dependent upon the vehicle wheel base and the position is dependent upon the wheel position of the vehicle relative to the test stand. For this reasons, it is necessary to be able to control the traveling carriages independently. It is also contemplated that two test stands can be positioned in tandem to receive all four vehicle wheels for testing of a four wheel drive vehicle or for brake testing.

The actuate command, which is input through the keyboard, tells the computer to move the restraining device into a restraining position. In step 402, a determination is made as to whether a restraint extend command, i.e., move restraining assemblies to an operative restraining position, has been activated or received. If the determination in step 402 is negative, the process loops back to itself. If the determination in step 402 is affirmative, the, process proceeds to step 404 where a determination is made as to whether the sensor eye 222 is blocked. This step tests to see if the restraining device is malfunctioning since the eye 222 should not be initially blocked. If the, determination is affirmative, the process loops back to step 402.

If the determination in step 404 is negative, the process proceeds to step 406 where a determination is made as to whether the second travel limit switch or the center limit switch 246 has been tripped. This step tests to see if the restraining device is malfunction since the switch 246 should not be initially tripped. If the determination in step 406 is affirmative, meaning a malfunction has occurred, the process loops back to step 402. If the determination in step 406 is negative, the process proceeds to step 408 where a determination is made as to whether a stop switch or command has been received. This stop function is accomplished using a separate emergency switch 303 or through entering of a stop command through the keyboard 304. If the determination in step 408 is affirmative, the process loops back to step 402.

If the determination in step 408 is negative, the process proceeds to step 420 where the restraint motor 152 is energized. When the motor 152 is energized in step 420, the traveling carriage 200 is moved toward a restraining position, i.e., toward the tire 403 because the drive screws 140, 180 are driven in rotation in an appropriate direction.

A determination is made in step 422 as to whether the eye 222 is blocked. The eye 222 first becomes blocked when the restraint roller 210 first aligns with the tire 403 and the tire blocks the light beam between the light transmitter 220 and the light receiver 222. It is desirable to drive the restraining wheels 208, 210, and 212 more toward a restraining position after first alignment occurs to insure that the restraint wheels 208, 210, and 212 are in their best operative restraining positions. From an affirmative determination in step 422, a time delay occurs in step 424 before a stop command is issued in step 426. The time delay 424 is of sufficient time, knowing the linear travel speed of the carriage 200, to insure that the proper restraining position of the front and rear restraining wheels 210, 212 and that of the side restraining wheel 208 is achieved.

If the determination in step 422 is negative, meaning that the traveling carriage 200 has not reached its operative restraining position, energization of the motor 152 is continued. A determination is made in step 430 as to whether the center or second limit switch 246 has been tripped. If the determination in step 430 is negative, the process proceeds to step 432 where a determination is made as to whether the emergency stop switch 303 or stop command through the keyboard 304 has be activated. If the determination in step 432 is negative, the process loops back to step 422.

If the determination in either step 430 or step 432 is affirmative, the process proceeds to step 426 where the motor 152 is stopped. After the motor 152 is stopped in step 426, the process proceeds to step 440 where a determination is made as to whether a test for which the test stand 10 is designed has been started. If the test stand 10 is a dynamometer, a braking force is applied to the wheels 403 through the energy converter 60 so as to load the vehicle engine. If the test stand 10 is a brake tester, drive force is applied to the vehicle wheels through the energy converter 60 to test the vehicle brakes. If the determination in step 440 is negative, the process loops back upon itself to step 440.

If the determination in step 440 is affirmative, the process proceeds to step 442 where a determination is made as to whether the eye 222 is blocked. If the vehicle has not moved on the test stand, the determination in step 442 would be affirmative and the process would proceed to step 444. If the vehicle does move an amount sufficient to have the vehicle wheel 403 no longer blocking the eye 222, the determination in step 442 would be negative and the process proceeds to step 446 where an OFF-CENTER warning is given to the test stand operator through the display 306 or other suitable warning device such as an alarm bell. From step 446, the process proceeds to step 444.

In step 444, a determination is made as to whether a test stopped command has been received. If the test is continuing, the determination in step 444 is negative and the process loops back to step 442. If the test is completed, the determination in step 444 is affirmative and the process proceeds to step 450.

In step 450, a determination is made as to whether a restraint retract command has been activated. If the determination in step 450 is negative, the process loops back upon itself to step 450. If the determination in step 450 is affirmative, the process proceeds to step 452 where a determination as to whether the edge or first limit switch 240 has been tripped. If the determination in step 452 is affirmative, the process loops back to step 450. The step 452 test to see if there is a problem with the switch 240. If the determination in step 452 is negative, a determination is made in step 454 as to whether the stop switch or stop command has been activated. If the determination in step 454 is affirmative, the process loops back to step 450 and the motor 152 is not activated. If the determination in step 454 is negative, the motor 152 is energized in step 460 which drives the traveling carriage 200 in a direction away from the tire 403 by rotating the drive screws 140, 180 in an appropriate direction.

In step 462, a determination is made as to whether the first or edge limit switch 240 has been tripped, i.e., has the traveling carriage 200 reached a fully retracted position. If the determination in step 462 is negative, a determination is made in step 464 as to whether the stop switch 303 or the stop command through the keyboard 304 has been actuated. If the determination in step 464 is negative, the process loops back to step 462 with the motor 152 still being actuated to further retract the traveling carriage 200.

From an affirmative determination in either step 462 or step 464, the process proceeds to step 470 where the motor 152 is stopped. An affirmative determination in step 464 is indicative of the traveling carriage 200 reaching the fully retracted position. After the motor is stopped, a stop sequence occurs in step 472 that locks the rolls 14, 16 and permits the vehicle to be driven off of the test stand 10.

This invention has been described with reference to preferred embodiments. Modifications and alterations may occur to others upon reading and understanding this specification. For example, the computer 300 used to control the restraining device of the test stand 10 can be the same computer used to perform the testing of the vehicle, e.g., pollution testing or brake testing. Also, the sensing devices 220, 222 have been described as being mounted near the end of the restraining wheels 210, 212, respectively, Which then requires use of the time delay in step 424 of FIG. 6. It is contemplated that the sensors may be mounted at a different location so that the motor 152 is deenergized immediately upon receipt of a signal from the sensor that the restraining rollers 210, 212, 208 are in a fully operative restraining position. Also, the sensor 218 has been described as an optical transmitter 220 and receiver 222. The sensor 218 can alternatively be any of several known sensors such as an ultrasonic transceiver or an infrared transmitter, receiver, or transceiver or other form of proximity sensor. Also, the electric motor 152, drive screws 140, 180, and the connecting drive belts 154, 194 can be replaced by a hydraulic linear motor, pump, and valves operatively connected between the frame 58 and the carriage 200. Extension or retraction of a piston of the linear motor through control of the valves would result in controlled movement of the carriage 200. It is our intention to include all such modifications and alterations insofar as they come within the scope of the appended claims and the equivalents thereof.

Having fully described the invention, the following is claimed:

1. An apparatus for automatically restraining a vehicle on a vehicle test stand, said test stand having a frame and at least one pair of rollers rotatably mounted to said frame, said apparatus comprising:
   restraining means movably mounted relative to said frame of said test stand so as to have a component of movement in a direction substantially parallel with an axis of the rollers, for, when moved into a restraining position, restraining movement of the vehicle on the test stand;
   motor means drivably connected to said restraining means for, when actuated, moving said restraining means relative to said frame;
   actuating means for providing a first signal when it is desired to move said restraining means into said restraining position and a second signal when it is desired to move said restraining means out of said restraining position; and
   control means connected to said motor means and to said actuating means for controlling energization of said motor means in response to said actuating means to move said restraining means into or out of said restraining position.

2. The apparatus of claim 1 wherein said motor means includes an electric motor means drivably connected to said restraining means and to said control means for, when said motor means is energized, moving said restraining means into or out of said restraining position.

3. The apparatus of claim 1 further including sensor means mounted to said restraining means for providing a signal indicative of whether said restraining means is adjacent a tire of said vehicle, said control means being connected to said sensor means, said control means, when said actuator means provides said first signal, energizing said motor means to move said restraining means into said restraining position until said sensor means indicates said restraining means is adjacent said tire.

4. The apparatus of claim 3 wherein said sensor means provides a signal indicative of when said restraining means comes to a first predetermined position relative to said tire and wherein said control means includes time delay means, said control means continuing to energize said motor means to move said restraining means in a restraining direction until a predetermine time after said sensor means first indicates that said restraining means has come to said first predetermined position relative to said tire.

5. The apparatus of claim 3 wherein said control means, when said actuator means provides said second signal, energizes said motor means to remove said restraining means out of said restraining position until a second sensor means indicates said restraining means is out of said restraining position.

6. The apparatus of claim 3 wherein said sensor means is an electric eye.

7. The apparatus of claim 1 wherein said restraining means further includes a restraining device and a linear bearing secured to said test stand frame, said restraining device being slidably mounted on said linear bearing.

8. The apparatus of claim 1 wherein said restraining means further includes a traveling carriage and a restraining device carried by said traveling carriage, said motor means drivably connected to said traveling carriage for, when actuated, moving said traveling carriage relative to said frame.

9. The apparatus of claim 8 wherein said motor means is drivably connected to said traveling carriage with a drive screw, said drive screw being rotatably mounted to said frame.

10. The apparatus of claim 1 wherein said test stand is a dynamometer with said at least one pair of rollers operatively connected to an energy conversion means and wherein said energy conversion means is an actuatable braking device.

11. The apparatus of claim 1 wherein said test stand is a dynamometer with said at least one pair of rollers operatively connected to an energy conversion means and wherein said energy conversion means is a motor absorber.

12. The apparatus of claim 1 wherein said test stand is a brake tester with said at least one pair of rollers operatively connected to an energy conversion means and wherein said energy conversion means is an actuatable drive motor.

13. The apparatus of claim 1 wherein said restraining means includes a front restraining device adapted to restrain forward movement of the vehicle and a rear restraining device adapted to restrain rearward movement of the vehicle when said restraining means is in said restraining position.

14. The apparatus of claim 1 wherein said restraining means includes a side restraining device adapted to restrain sideways movement of the vehicle when said restraining means is in said restraining position.

15. The apparatus of claim 1 further including sensor means for sensing when said restraining means is in said restraining position and for providing a signal indicative thereof, said control means being connected to said sensor means, said control means, when said actuator means provides said first signal, energizing said motor means to move said restraining means into said operative restraining position until said sensor means indicates said restraining means is in said restraining position.

16. A method for restraining a vehicle on a vehicle test stand, said test stand having a frame and at least one pair of rollers rotatably mounted to said frame, said method comprising the steps of:
providing a restraining device movably mounted relative to said frame of said test stand;
providing a motor means drivably connected to said restraining device for, when actuated, moving said restraining device relative to said frame so as to have a component of movement in a direction substantially parallel with an axis of the rollers;
providing a first signal when it is desired to move said restraining means into an operative restraining position;
providing a second signal when it is desired to move said restraining means out of said operative restraining position; and
energizing said motor means in response to said first and second signals for moving said restraining means into or out of said operative restraining position.

17. The method of claim 16 further comprising the steps of sensing whether said restraining means is adjacent a tire of said vehicle and providing a signal indicative thereof, energizing said motor means to move restraining means into said operative restraining position until said step of sensing indicates said restraining device is adjacent said tire.

18. The method of claim 17 further comprising the steps of continuing to energize said motor means to move said restraining means in a restraining direction until a predetermine time after said step of sensing indicates that said restraining device has first aligned with said tire.

19. The method of claim 17 further comprising the steps of energizing said motor means to move said restraining means out of said operative restraining position when said second signal is provided, sensing when said restraining device is out of said operative restraining position, and stopping energization of said motor means when said restraining device is sensed as being out of said operative restraining position.

20. An apparatus for automatically restraining a vehicle on a vehicle test stand, said test stand having a frame and at least one pair of rollers rotatably mounted to said frame, said apparatus comprising:
restraining means movably mounted relative to said frame of said test stand and including a traveling carriage and a restraining device carried by said traveling carriage;
motor means drivably connected to said traveling carriage for, when actuated, moving said traveling carriage relative to said frame, said motor means being drivably connected to said traveling carriage with a drive screw, said drive screw being rotatably mounted to said frame;
actuating means for providing a first signal when it is desired to move said restraining means into an operative restraining position that restrains movement of the vehicle relative to said frame and a second signal when it is desired to move said restraining means out of said operative restraining position; and
control means connected to said motor means and to said actuating means for controlling energization of said motor means in response to said actuating means to move said restraining means into or out of said operative restraining position.

21. An apparatus for automatically restraining a vehicle on a vehicle test stand, said test stand having a frame and at least one pair of rollers rotatably mounted to said frame, said apparatus comprising:
a drive screw rotatably mounted to said frame;
a traveling carriage threadably mounted to said drive screw so that rotation of said drive screw in a first direction moves said traveling carriage in a first direction, and rotation of said drive screw in a second direction moves said traveling carriage in a second direction;
restraining means carried by said traveling carriage;
motor means drivably connected to said drive screw for, when actuated, driving said drive screw in rotation for movement of said traveling carriage and said restraining means;
actuating means for providing a first signal when it is desired to move said restraining means into an operative restraining position and a second signal when it is desired to move said restraining means out of said operative restraining position;
sensor means carried by said traveling carriage for providing a signal indicative of whether said restraining means is adjacent a tire of said vehicle, wherein said sensor means is an electric eye; and control means connected to said motor means, to said actuating means, and to said sensor means for controlling energization of said motor means in response to said actuating means to move said restraining means into said operative restraining position until said sensor means indicates said restraining means is adjacent said tire or out of said operative restraining position.

22. An apparatus for automatically restraining a vehicle on a vehicle test stand, said test stand having a frame and at least one pair of rollers rotatably mounted to said frame, said apparatus comprising:

restraining means mounted at an elevation above said rollers and movably mounted relative to said frame of said test stand for, when moved into a restraining position, substantially restraining movement of the vehicle on said test stand, said restraining means including a traveling carriage and a restraining device carried by said traveling carriage;

motor means drivably connected to said traveling carriage with a drive screw, said drive screw being rotatably mounted to said frame for, when actuated, moving said traveling carriage relative to said frame so as to move said restraining device into or out of said restraining position;

actuating means for providing a first signal when it is desired to move said restraining means into said restraining position and a second signal when it is desired to move said restraining means out of said restraining position; and control means connected to said motor means and to said actuating means for controlling energization of said motor means in response to said actuating means to move said restraining means into or out of said restraining position.

* * * * *

UNITED STATES PATENT AND TRADEMARK OFFICE
CERTIFICATE OF CORRECTION

PATENT NO. : 5,402,674
DATED : April 4, 1995
INVENTOR(S) : Donald W. Ganzhorn, Jr., Eser Manav and Dale A. Pulver It is certified that error appears in the above-indentified patent and that said Letters Patent is hereby corrected as shown below:

Column 11, lines 39-40, after "said" (second occurence) delete --operative--.

Signed and Sealed this

Twenty-fifth Day of July, 1995

Attest:

BRUCE LEHMAN

Attesting Officer

Commissioner of Patents and Trademarks